United States Patent
Mount

(10) Patent No.: US 7,457,896 B1
(45) Date of Patent: Nov. 25, 2008

(54) AUTOMATED REGISTER DATA TRANSFER TO REDUCE PROCESSING BURDEN ON A PROCESSING DEVICE

(75) Inventor: John Arthur Mount, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/494,787

(22) Filed: Jan. 31, 2000

Related U.S. Application Data

(60) Provisional application No. 60/150,712, filed on Aug. 25, 1999.

(51) Int. Cl.
G06F 13/12 (2006.01)

(52) U.S. Cl. .............................. 710/74; 710/5; 710/22; 360/55

(58) Field of Classification Search ............. 710/22–74, 710/308–317; 711/100; 360/31; 369/99
See application file for complete search history.

(56) References Cited

U.S. PATENT DOCUMENTS

| | | | |
|---|---|---|---|
| 3,883,853 A * | 5/1975 | O'Brien et al. ................ 711/4 |
| 5,121,260 A * | 6/1992 | Asakawa et al. ............. 360/31 |
| 5,255,136 A * | 10/1993 | Machado et al. ......... 360/77.02 |
| 5,276,564 A * | 1/1994 | Hessing et al. ................ 360/51 |
| 5,420,543 A | 5/1995 | Lundberg et al. |
| 5,422,760 A | 6/1995 | Abbott et al. |
| 5,422,871 A | 6/1995 | Nakashima et al. |
| 5,430,768 A | 7/1995 | Minuhin et al. |
| 5,438,665 A * | 8/1995 | Taniai et al. ................... 710/25 |
| 5,457,787 A * | 10/1995 | Asano et al. ................. 710/305 |
| 5,459,757 A | 10/1995 | Minuhin et al. |
| 5,559,645 A | 9/1996 | Miyazawa et al. |
| 5,586,098 A * | 12/1996 | Nishida et al. .............. 369/116 |
| 5,592,348 A | 1/1997 | Strang, Jr. |
| 5,642,244 A | 6/1997 | Okada et al. |
| 5,666,546 A * | 9/1997 | Donnan ....................... 711/145 |
| 5,668,815 A * | 9/1997 | Gittinger et al. ............ 714/719 |
| 5,687,036 A | 11/1997 | Kassab |
| 5,715,106 A | 2/1998 | Kool et al. |
| 5,721,816 A | 2/1998 | Kusbel et al. |
| 5,768,617 A * | 6/1998 | Liu ............................... 710/5 |
| 5,828,856 A * | 10/1998 | Bowes et al. ................ 710/308 |
| 5,829,011 A * | 10/1998 | Glover ........................ 711/100 |
| 5,870,628 A * | 2/1999 | Chen et al. .................... 710/22 |
| 5,920,564 A | 7/1999 | Leichty et al. |
| 5,930,464 A | 7/1999 | Nakayama et al. |
| 6,260,095 B1 * | 7/2001 | Goodrum .................... 710/310 |
| 6,381,085 B1 * | 4/2002 | Du et al. ....................... 360/65 |
| 6,411,452 B1 * | 6/2002 | Cloke .......................... 360/51 |
| 6,643,081 B1 * | 11/2003 | Walker et al. ................ 360/31 |

OTHER PUBLICATIONS

The Microsoft Computer Dictionary, 2002, Microsoft Press, Fifth Edition, pp. 77 and 78.*

* cited by examiner

*Primary Examiner*—Eron J Sorrell
(74) *Attorney, Agent, or Firm*—Fellers, Snider, et al.

(57) ABSTRACT

Operating parameters and other read channel registers are updated with a lesser burden on the disc drive's primary processor. After a zone transition event, table values indexed by a zone identifier are retrieved from a memory, preferably by a direct memory access controller. In one method, updates are performed via the same NRZ bus that is used for transmitting user and servo data.

23 Claims, 9 Drawing Sheets

AUTOMATED REGISTER DATA TRANSFER TO REDUCE PROCESSING BURDEN ON A PROCESSING DEVICE

RELATED APPLICATIONS

This application claims the benefit of U.S. Provisional Application No. 60/150,712 filed on Aug. 25, 1999.

FIELD OF THE INVENTION

The present invention relates to data handling systems, and more particularly to those storing data on rotatable discs of the "zoned" type.

BACKGROUND OF THE INVENTION

A diverse class of data storage systems use rotatable discs as recording media. Although these systems are usually categorized by the type of media (fixed/removable, optical/magnetic, etc.), some things are common to all. Basically, these systems use a lens, a magneto-resistive (MR) element, or another suitable head positioned adjacent a disc to read portions of concentric tracks on a disc, and associated electronics that control the generation of signals carrying digital data to be stored. Subsequently, the transitions stored on the disc surface are sensed so that the stored data can be retrieved.

As discussed in U.S. Pat. No. 4,799,112 ("Method and Apparatus for Recording Data") issued Jan. 17, 1989 to Bremmer et al., the performance of such a system can be improved by grouping each disc's tracks into annular zones, each of which has certain properties that are kept uniform. The annular zones are separated by zone boundaries, across which the controlled properties may change abruptly. Conventionally, these have included such properties as circumferential bit density or data frequency. The Bremmer et al. patent discloses a circuit for implementing this approach to data storage optimization and further discloses a method for selecting the zone frequencies and track-to-zone assignments in a way that will result in a substantially constant error rate in the writing and subsequent reading of data on and from all tracks on the disc.

More recently, many disc drive applications have adopted configurations using storage discs with annular zones. Moreover, an increasing number of reading and writing subsystems in a disc drive have begun to operate differently, in a zone-dependent fashion. In particular, many modern disc drives use the drive's primary processor to update the head's operating parameters and/or read channel registers via a serial bus, bit by bit. Performing such updates in this manner burdens the primary processor significantly and sporadically, especially when the number of values to be updated exceeds ten and when the zone to be read from switches frequently. Unfortunately, this interferes significantly with the processor's ability to perform its other functions.

SUMMARY OF THE INVENTION

Methods and devices of the present invention update operating parameters and/or read channel registers with a lesser burden on the disc drive's primary processor. Table values are retrieved, optionally manipulated, and then used to update operating parameters or other register values. Type I methods of the present invention perform updates via a parallel bus, optionally the same parallel bus that is conventionally used for transmitting user and servo data. This relieves congestion on the serial bus connecting the microcontroller to read channel circuitry, and may allow elimination of that serial bus in certain applications.

Type II methods of the present invention use a serial bus to perform updates, but differ from prior systems by retrieving values via a direct memory access (DMA) controller. The DMA controller can preferably retrieve values and perform the updates with a minimum of direction from the primary controller. This relieves the primary controller from mundane tasks it would otherwise have to perform on a zone transition event (ZTE). Note that a triggering ZTE need not be a head crossing a zone boundary, but may be a head switch, a servo interrupt routine (SIR) indicative of a long seek, or any of several other events associated with preparing to read data from a different zone.

The inventive devices presented below are distinct from the above methods, but are generally preferred over other structures which may be adapted for performing those methods. Each device includes a disc stack, an interface, a controller chip, and a channel chip, any or all of which may be merely conventional. Each further provides a memory containing a table indexed by zone identifiers and configured to be read in response to a zone transition event. The table is desirably on a memory chip nearby and accessible to a DMA controller on the controller chip.

Further features and benefits of the present invention will become apparent to one of ordinary skill upon a careful review of the following drawings and accompanying detailed description.

DETAILED DESCRIPTION

Numerous aspects of disc drive technology that are not a part of the present invention (or are well known in the art) are omitted for brevity, avoiding needless distractions from the essence of the present invention. These include detailed mechanisms for the construction, selection, or movement of heads, and mechanisms for deriving a signal indicative of stable biasing, track following, or other signals indicative of readiness to transmit user data. Although the examples below show more than enough detail to allow those skilled in the art to practice the present invention, subject matter regarded as the invention is broader than any single example below. The scope of the present invention is distinctly defined, however, in the claims at the end of this document.

Figure 1:
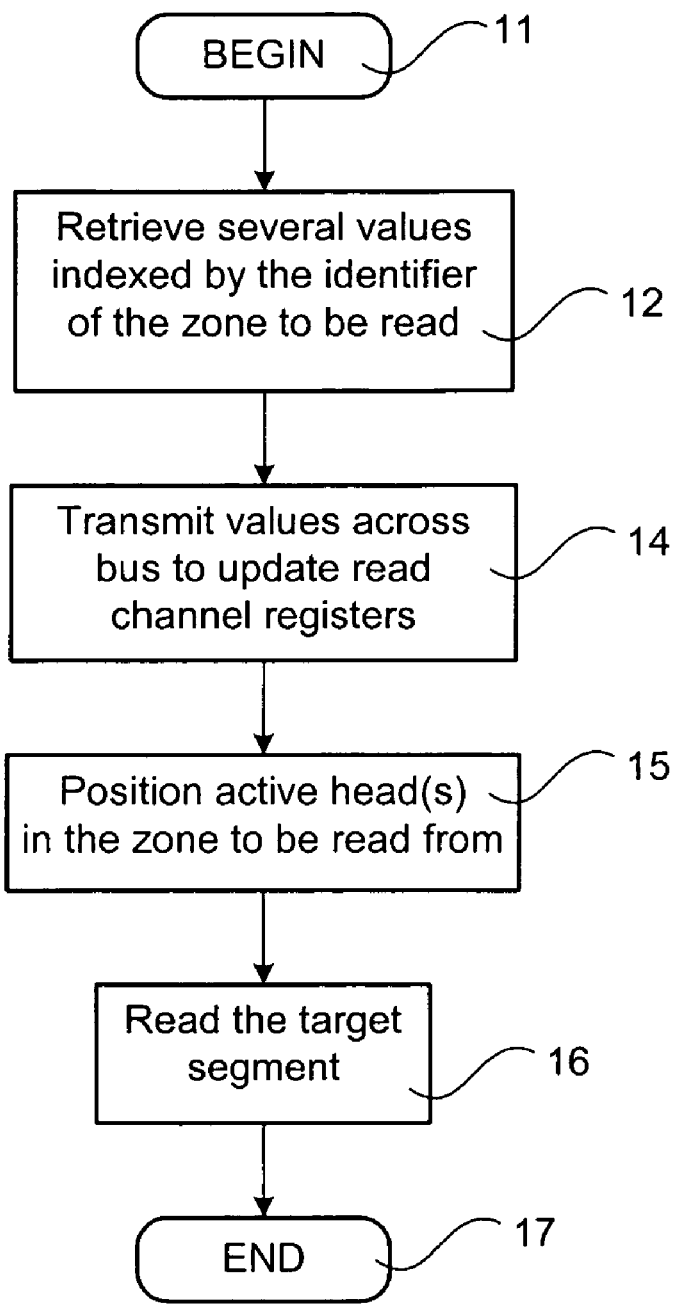
FIG. 1 shows a basic method of the present invention which operates upon several values stored in a table.
Figure 2:
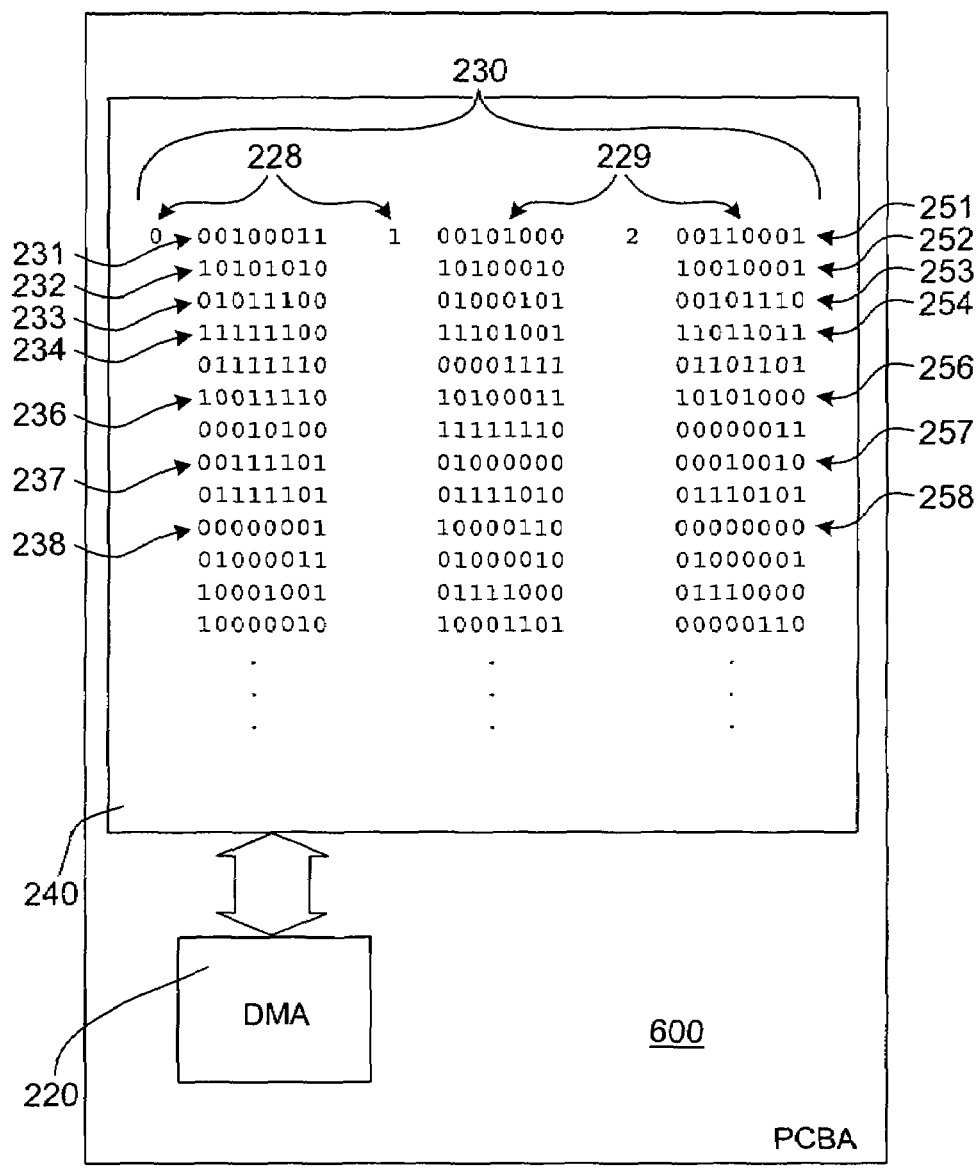
FIG. 2 is a schematic view of a printed circuit board assembly including a memory containing a value table indexed by a plurality of zone identifiers.

FIG. 1 shows a basic method of the present invention which operates upon several values stored in a table. FIG. 2 shows table 230, which includes blocks of stored values 229 indexed by a plurality of zone identifiers 228. Zone identifiers are exemplified as integers starting from zero, as is conventional in the art. The method comprises steps 11-17 of FIG. 1, in which it is assumed that the location (and zone) of the data segment to be read is given. In step 12, several values 229 indexed by zone identifier 228 are retrieved from table 230. In step 14, the values are transmitted across a bus to update several of the registers that control the read channel. The retrieving step 12 and the transmitting step 14 are optionally performed simultaneously or alternately in increments, preferably by DMA controller 220. Active head(s) are positioned in the target segment's zone 15 preferably by a seek operation performed concurrently with retrieving step 12 and transmitting step 14. After the completion of the last of steps 12, 14, and 15, the target segment is read 16. Note that the method of FIG. 1 may be performed repeatedly in reading a file with portions in more than one data zone.

FIG. 2 shows printed circuit board assembly (PCBA) 600 having a DMA controller 220 and a memory 240 containing a value table 230. Depending on performance and price constraints, memory 240 may be an off-the-shelf memory chip or a circuit on the same chip as the DMA controller 220. Table 230 contains several zone ID's 228 each associated with a block of values 229 in a predetermined sequence. The first values 231,251 in each block indicate head bias expressed in microamps, left-shifted two bits. Value 231 thus indicates that when reading from zone 0, the active read head should have a bias current of 1000.112=8.8 microamps. Value 251 similarly indicates that when reading from zone two (zone ID=2), the head bias should be 12.2 microamps.

Values 232 & 252 similarly express respective gain values of 170 and 145. Values 233 & 253 similarly express sectors/track values of 92 and 46. Values 234 & 254 similarly express respective nominal frequency values (in Mbits/second) of 252 and 219. Values 236 & 256 similarly express respective first-order filter coefficient values (scaled by bit-shifting) of 158 and 168. Values 237 & 257 similarly express respective third-order filter coefficient values (scaled by bit-shifting) of 61 and 18. Table values in devices of the present invention may also include read channel parameter or head-specific operating parameters such as write precompensation modes or current levels, bias offset values, phase offset values, flag register values, count values, clock modes, and the like. Further background concerning the adjustment of read channel register values such as pulse detector amplitude thresholds, filter coefficients, time constants, cutoff frequencies and the like can be found in U.S. Pat. No. 5,642,244 ("Method and Apparatus for Switching Between Data and Servo Modes") issued Jun. 24, 1997 to Okada et al. Further background concerning zone clock modes can be found in U.S. Pat. No. 5,459,757 ("Timing and Gain Control Circuit for a PRML Read Channel") issued to Minuhin et al. on Sep. 21, 1994. A preferred embodiment of the present invention updates a clock frequency parameter in preparation for reading data in a different zone.

Values 238 & 258 each contain a left-most bit one bit indicating time-critical data mode (e.g. for video data). In each case, the bit is zero, indicating that the data in zones 0 and 2 are integrity-critical (i.e. not time-critical). In a preferred embodiment of the present invention, error recovery sequences execute differently depending upon the value of the left-most bit in the first-listed byte of the values 229 in table 230.

Figure 4:
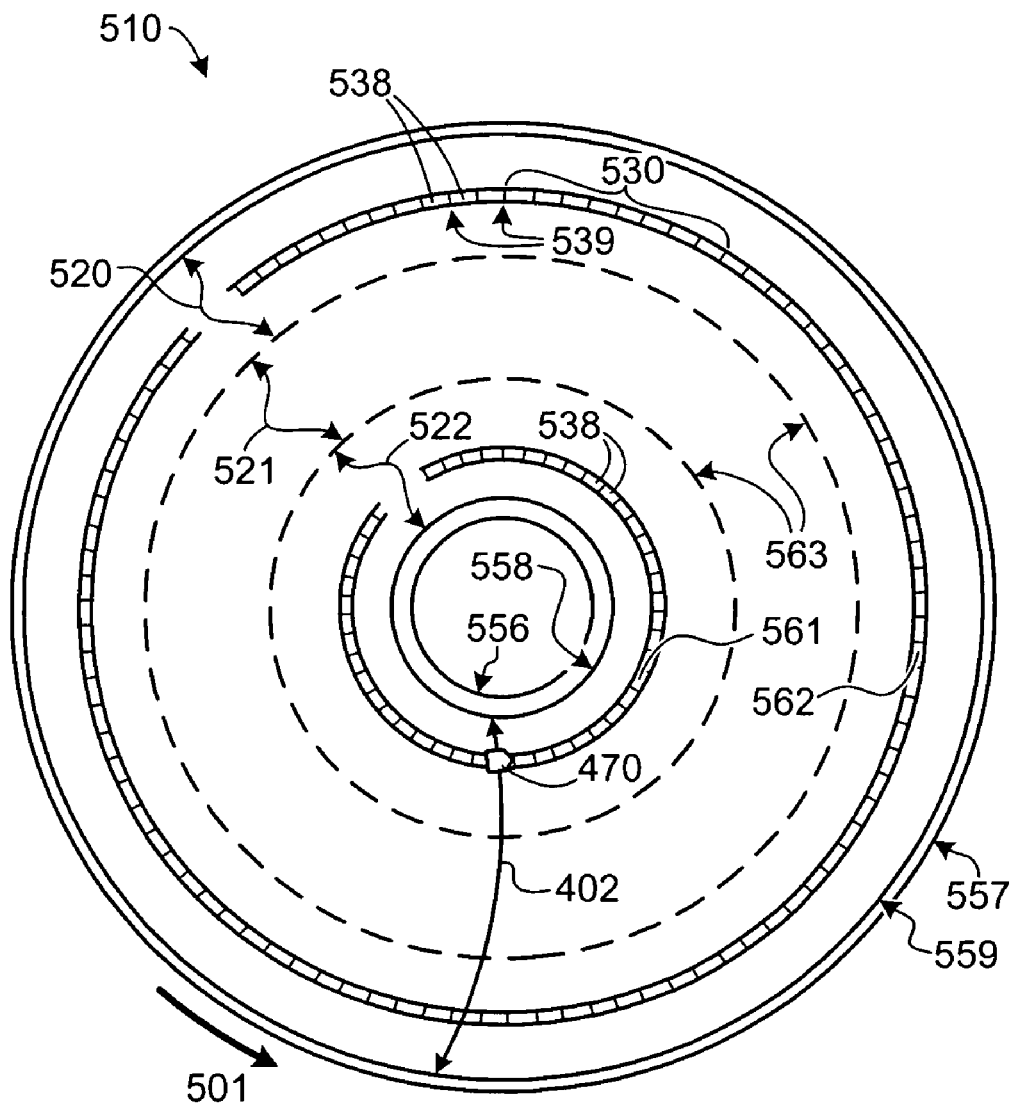
FIG. 4 shows a physical view of the disc of FIGS. 2 & 3, roughly to scale.

The other seven bits of values 238 & 258 contain these mode-identifying bits: one bit indicating constant density recording (CDR) mode; one bit indicating data compression mode; one bit indicating frequency acquisition mode; one bit indicating phase acquisition mode; one bit indicating skew compensation mode; and two bits indicative of M and N (explained below). Note that skew compensation mode is set (active) in zones 0 and 2, but not in zone 1. This mechanism is used to indicate that the angle between the transducer and the track edges is greatest in zones 0 and 2, in the present embodiment. FIG. 4 shows that transducer 470 traverses an arcuate path 402 that is least aligned with zone boundaries 563 in zones 0 and 2, which is why skew compensation is desirable there. In a preferred embodiment, the frequency or phase acquisition mode bits can be reset when slave IC 300 senses that accurate frequency or phase has been ascertained. Further detail about control systems making use of frequency and phase acquisition and maintenance modes is found in U.S. Pat. No. 5,420,543 ("Method and Apparatus for Determining a Constant Gain of a Variable Oscillator") issued May 30, 1995 to Lundberg et al.

Concerning M and N, data on a disc surface is conventionally divided into "frames" (typically less than that which can fit in a track) each containing a number of sectors (an integer conventionally designated as "N") and also containing a number of servo marks (an integer conventionally designated as "M"). Further background relating to calculations of sector and servo mark counts is found in U.S. Pat. No. 5,768,043 ("Table Driven Method and Apparatus for Automatic Split Field Processing") issued to Nemazie et al. on Jun. 16, 1998. In a preferred embodiment of the present invention, some of the retrieved data will be used to update operating parameters derived from M or N, M or N having values that differ across at least one zone boundary of a disc surface. Note that in the depiction of FIG. 2, M and N are encoded in just two bits to conserve space in the value table 230. Each of these integers may alternatively be represented by a respective byte, where table space is at less of a premium.

Another reference articulating the use of mode initialization is U.S. Pat. No. 5,559,645 ("Disk Recording Apparatus with Adaptive Window Adjusting") issued Sep. 24, 1996 to Miyazawa et al., which exemplifies a mechanism for switching among four write precompensation modes. A preferred method of the present invention includes steps of initializing a mode in response to a zone transition event by setting a mode switch and of resetting the mode switch in response to a signal indicative of stable biasing and/or track following.

Figure 3:
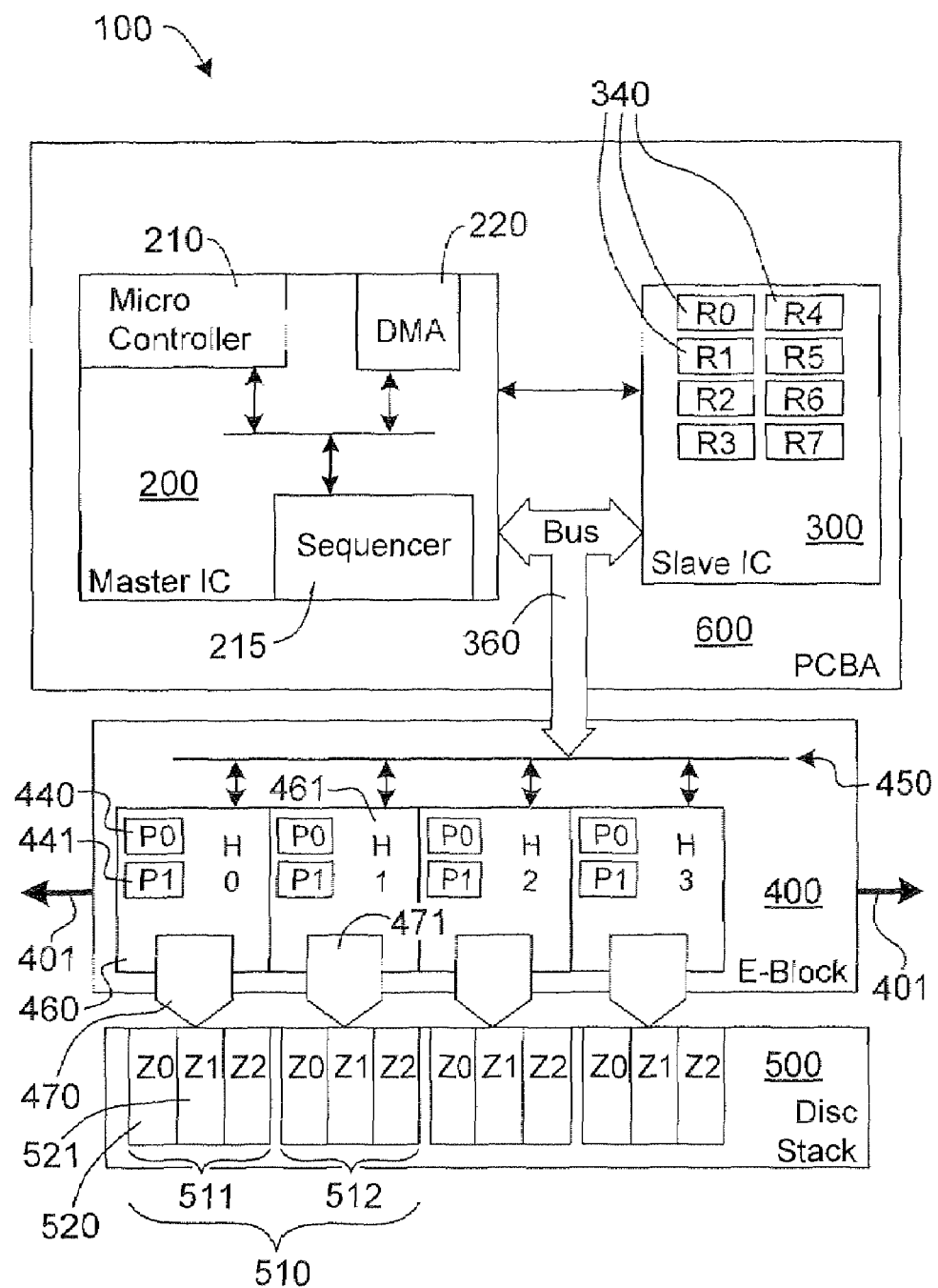
FIG. 3 is a schematic view of a disc drive of the present invention consistent with FIG. 2, showing another portion of the same PCBA.

FIG. 3 is a schematic view of a disc drive 100 of the present invention consistent with FIG. 2, comprising E-block 400, disc stack 500, and PCBA 600. The PCBA includes a master IC 200 and a slave IC 300. The master IC 200 contains a micro controller 210, a sequencer 215, and the DMA controller 220 (of FIG. 2). The slave IC 300 contains several registers 340, at least some of which control the operation of the read channel. These IC's are operatively coupled to bus 360. Affixed to E-block 400 are heads 460,461 each having a read transducer 470,471 and a plurality of operating parameters 440,441. An interface 450 coupled between bus 360 and heads 460,461 is configured to provide a mechanism for head selection, many of which are known in the art. According to methods of the present invention explained below, register values are updated on zone transitions. In a preferred embodiment, some registers are only updated on a selected subset of zone transition events, such as those accompanied by a head switch.

Interface 450 may optionally be a preamp chip having a head selection mechanism. Disc stack 500 includes discs 510 each having two recording surfaces 511,512. Each surface 511 has a plurality of zones 520,521. E-block 400 has a degree of freedom 401 that allows each transducer 470,471 to move across zone boundaries 563.

FIG. 4 shows a physical view of the disc 510 of FIGS. 2 & 3, roughly to scale. Disc 510 has an inner diameter 556 and an outer diameter 557. Transducer 470 traverses an arcuate radial path 402 between the inner diameter 558 and the outer diameter 559 of the data surface. The data surface is divided into several zones 520,521,522 bounded by zone boundaries 563. Tracks 561,562 each contain several sectors 538, at least some of which having servo sectors 539 between them. In the position shown in FIG. 4, transducer 470 is positioned so that it can read track 561 as disc 510 rotates.

Suppose that a target sector 530 is desired to be read. E-block 400 is moved so that transducer 470 moves radially to the outermost zone 520 (Z0). The data rate (i.e. through transducer 470 and bus 360) depends on both the spin speed 501 and position of transducer 470. As FIG. 4 shows, Z0 has many more sectors per track than Z2. Before reading data in target segment 530, therefore, disc spin speed 501 must decrease and/or the data rate must increase. In a real-world disc drive, many operating parameters are desirably changed when preparing to read from a different zone (i.e. upon a "zone transition event").

Figure 5:
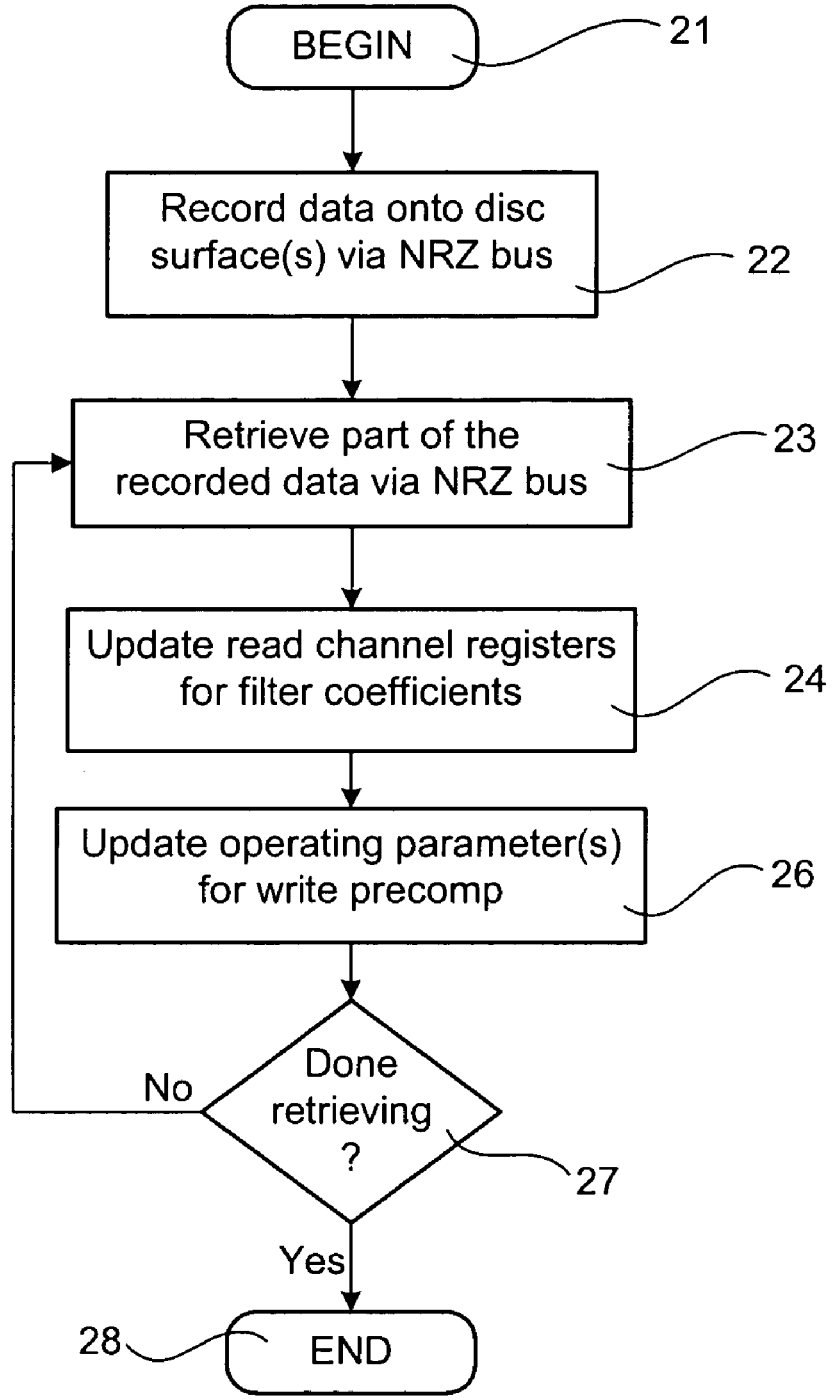
FIG. 5 shows a Type I method of the present invention using a non-return-to-zero (NRZ) bus.

FIG. 5 shows a Type I method of the present invention comprising steps 21 through 28. Data is recorded onto a disc surface via a non-return-to-zero (NRZ) bus 22. A part of the data is later retrieved via the bus 23, after which the bus is used to update read channel registers 24 and head operating parameters 26. A test is performed to ascertain whether the desired data has been retrieved 27. This test optionally includes confirming that a decremented register indicative of bytes remaining to transfer has reached zero. If the transfer is not complete, another part of the data is retrieved via the NRZ bus 23.

Figure 6:
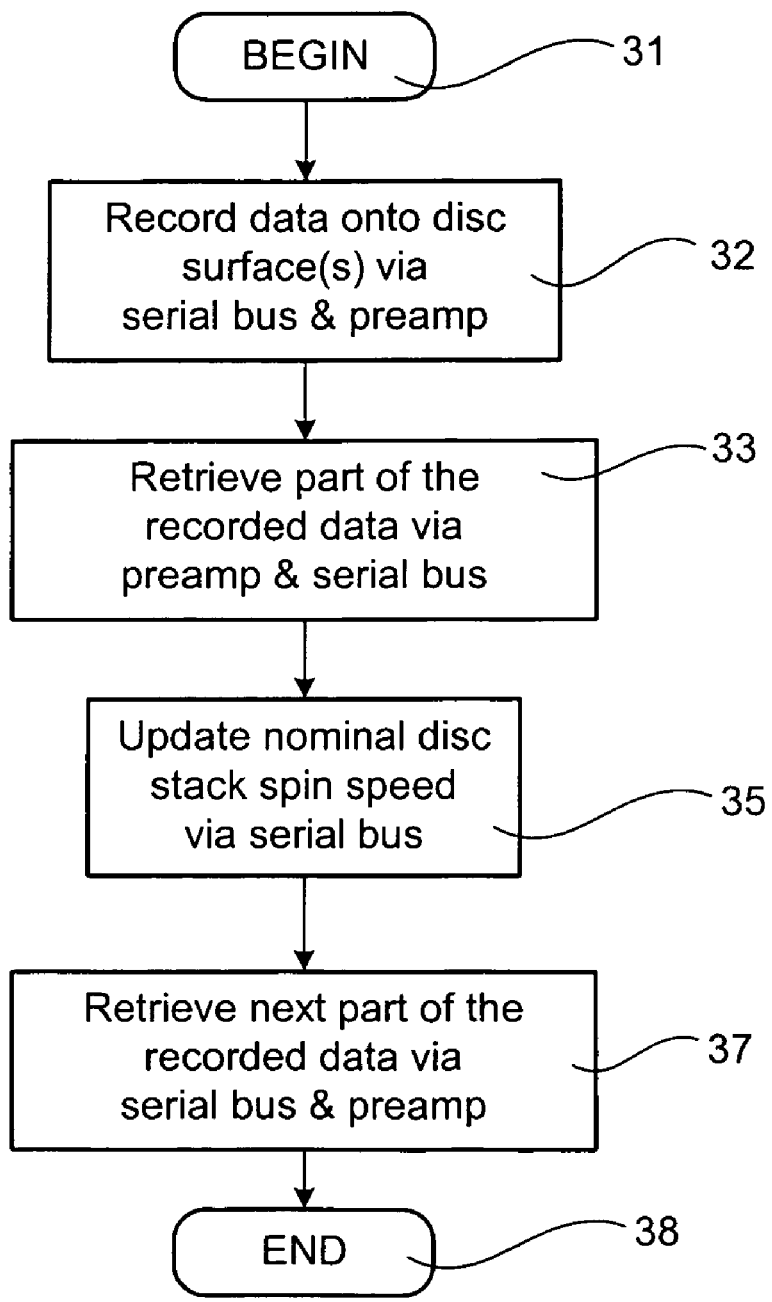
FIG. 6 shows a Type II method for the present invention using a serial bus.

FIG. 6 shows a Type II method for the present invention comprising steps 31 through 38, using a system comprising a serial bus operatively coupled to a preamp. Data is recorded onto the disc surface(s) via the serial bus and preamp 32, and is later retrieved 33 the same way. After updating the nominal or initial disc stack spin speed via the serial bus 35, another part of the recorded data is retrieved, also via the path through the serial bus and preamp 37.

Figure 7:
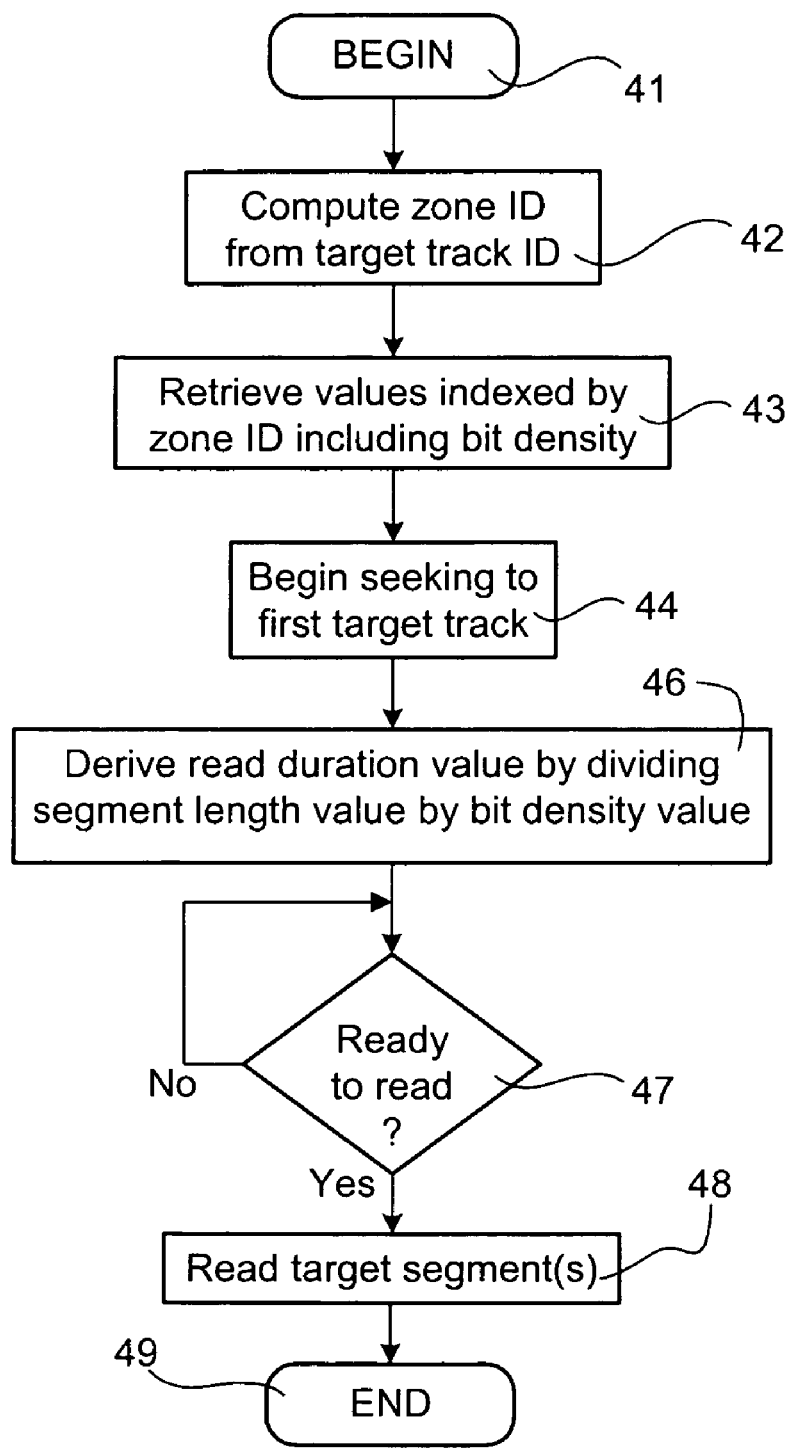
FIG. 7 shows a detailed method compatible with either Type I or Type II.

FIG. 7 shows a detailed method compatible with either Type I or Type II, comprising steps 41 through 49. This method treats target ID values and target segment length values as given (i.e. predetermined). A zone ID is derived from the target ID 42, such as by an integer division, table lookup, or by other methods known in the art. The zone ID is used to retrieve an associated set of values from the table 43, one of which is a bit density within that zone. Around the time that steps 42 and 43 are performed, a seek operation is initiated to begin moving a head toward the target track 44. A preferred method of the present invention initiates mechanical steps such as step 44 without waiting for computational and memory-retrieval steps such as steps 42 and 43.

Once a transducer is over the data and the system is ready to read 47, the target segment is read 48. Also, the segment length value is divided by the bit density value to derive a value indicative of estimated read duration 46. This value is useful for a variety of purposes recognizable by one of ordinary skill in the art. In one exemplary system, a microprocessor is configured to ignore received user data until a "ready to read" signal is received and most of the estimated duration passes.

Preferred embodiments of the present invention respond to a zone transition event by reading from the memory via a DMA controller and by updating several registers. A preferred "zone transition event" is a sequencer command to move to another zone, because it allows a preparatory part of the read step 48 to occur early, usually before the head crosses any zone boundaries. Also note that the preparatory step of updating a register does not always cause a register value to change, if the read, measured, predetermined, or derived value is the same as the register's prior value.

A preferred embodiment of the present invention performs calculations upon at least some values read from the table before using the values to update register values. As a simple example, suppose that a block of data is needed from each of two adjacent zones $Z_A$ and $Z_B$ which have the same bit density (e.g. in bits per inch, BPI). Suppose further that a register value to be updated indicates the circumferential length of the target segment in inches. After reading the block from zone $Z_A$, a suitable embodiment of the present invention updates the register value by retrieving the bit density associated with zone $Z_B$. Then, the embodiment divides the length (1 block) by the new bit density (after multiplying by the constant number of bits per block). This update does not result in a change of the register value.

Figure 8:
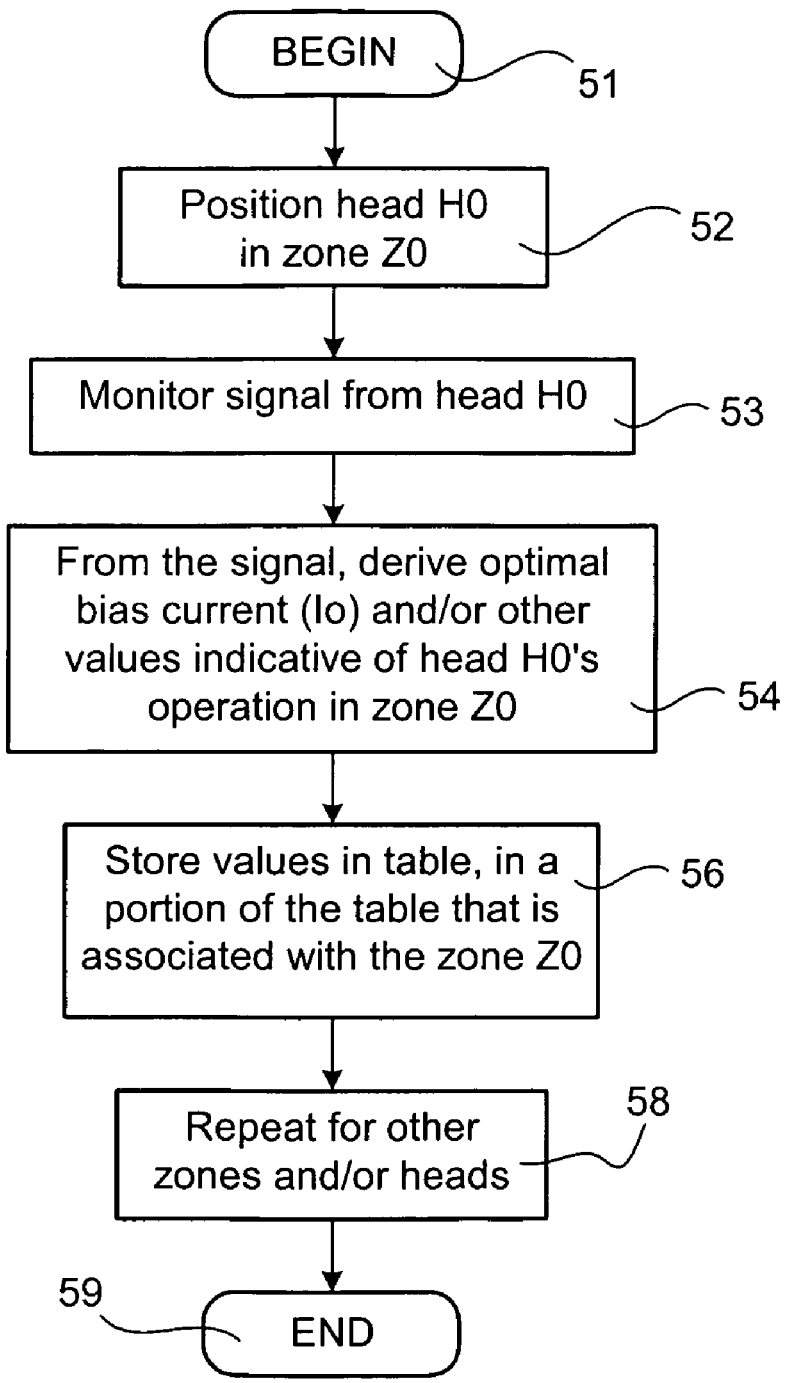
FIG. 8 shows a preferred method for creating tables for use with the present invention.

FIG. 8 shows a preferred method for creating tables for use with the present invention, having steps 51 through 59. A head is positioned in a first zone 52. A signal is received from the head 53 and values indicative of the head's operation in the zone are derived 54. These values may include an optimal bias current, precompensation values, or other operating parameters of inductive or magneto-resistive heads known in the art of disc drives. Additional background relating to deriving zone-dependent write current values is found in U.S. Pat. No. 5,687,036 ("Selection of Optimum Write Current in a Disc Drive to Minimize the Occurrence of Repeatable Read Errors") to Kassab on Nov. 11, 1997. Optimal values associated with the first zone are stored in a table, in a portion that is associated with that zone 56. Next, optimal values for other zones and/or heads are similarly derived and stored 58.

Figure 9:
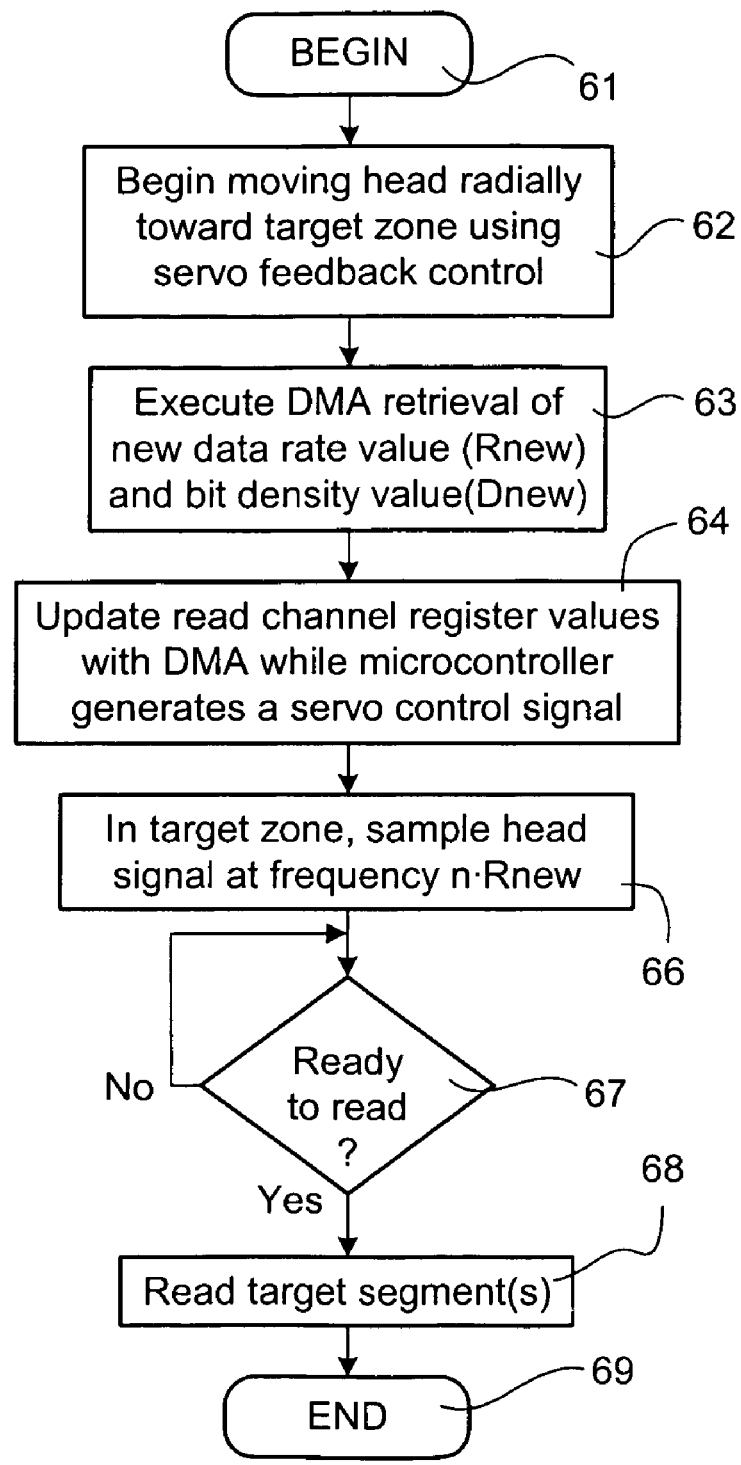
FIG. 9 shows a preferred method of retrieving user data according to the present invention.

FIG. 9 shows a preferred method of retrieving user data according to the present invention, comprising steps 61 through 69. Head motion in a radial direction begins, using servo feedback control 62. A microcontroller instructs the DMA controller to execute a block retrieval to obtain a data rate value ($R_{new}$) and a bit density value ($D_{new}$) corresponding to the target track 63 from a value table. This execution step 63 is desirably performed with fewer than 10 commands from the microcontroller. Note that this is not possible for a microcontroller (like microcontroller 210 of FIG. 3) fetching and writing each value of a table with a large number of values.

Being thus freed from most tasks associated with updating register values and operating parameters on zone transition events, the microcontroller of FIG. 9 is able to serve other important functions (e.g. generate a servo control signal) simultaneously with the DMA transmitting data to update register values 64. An initial value for the data channel sample rate is obtained as an integer number (n) times $R_{new}$. After passing into the target zone, the signal received from the active head is sampled at this rate 66. Once the head is suitably positioned 67, the target segment is read 68.

By way of review, certain methods of the present invention are directed to retrieving a target data segment having a given track ID. First, a zone ID is derived from the track ID 42. Values indexed by the zone ID are retrieved 43 and register values are updated in response to the retrieval 46. After a seek operation moves the head to the track with the given track ID 44,47, the target segment is read 48.

Devices of the present invention may include a memory 230 containing several values 229 indexed by zone identifiers 228, a controller chip 200 containing a microprocessor 210 and a DMA controller 220, the DMA controller operatively coupled to the memory 230. They may also include a channel chip 300 having several registers 340 and a bus 360 operatively coupled between an interface 450 and these chips 200, 300. If the device is a disc drive, it will further include at least one disc 510 which can be coupled to the interface 450 through a movable assembly (such as E-block 400).

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, steps of the above methods can be reordered while maintaining substantially the same functionality, without departing from the scope and spirit of the present invention. In addition, although the preferred embodiments described herein are largely directed to fixed magnetic media, it will be appreciated by those skilled in the art that many teachings of the present invention can be applied to other systems without departing from the scope and spirit of the present invention.

What is claimed is:

1. In an apparatus having a bus operatively coupled to a first controller chip and a first channel chip, the channel chip having several registers, the apparatus also having a storage medium operatively coupled to the bus through a storage medium interface, a method for retrieving data recorded on the storage medium comprising steps of:
    (a) retrieving a first portion of the recorded data via the bus in response to a first read command;
    (b) updating some of the registers via the bus in response to a zone transition event during the first read command; and
    (c) retrieving a second portion of the recorded data via the bus in response to the first read command.

2. The method of claim 1 in which the interface includes a read head, further comprising a step (d) of repositioning the storage medium interface with respect to the storage medium, between retrieving steps (a) and (c).

3. The method of claim 2 in which the interface has a plurality of operating parameters that are modified in updating step (b).

4. The method of claim 1 in which the registers contain at least one read channel parameter value selected from the group consisting of: a precompensation value, a filter coefficient value, and a phase offset value.

5. The method of claim 1 in which the registers contain at least one mode-indicative value.

6. In a storage system having a disc with at least two zones having zone identifiers $Z_A$ and $Z_B$, an interface configured to read data in zone $Z_A$, a target segment in zone $Z_B$, a value table indexed by zone identifiers, a direct memory access (DMA) controller, a microprocessor coupled to the DMA controller, and several read channel registers each containing a value, a method comprising steps of:
    (a) retrieving via the DMA controller several values indexed by zone identifier $Z_B$;
    (b) updating at least some of the read channel register values from the retrieved values;
    (c) reconfiguring the interface to read data in zone $Z_B$; and
    (d) reading the target segment.

7. The method of claim 6 in which the target segment has a predetermined starting track number, further comprising a step of deriving zone identifier $Z_B$ from the predetermined starting track number before retrieving step (a).

8. The method of claim 6 in which the interface includes at least one head, in which positioning step (c) includes a step of (c1) moving the at least one head radially across the disc, the moving step (c1) beginning before retrieving step (a) is complete.

9. The method of claim 8 in which moving step (c1) begins before retrieving step (a) begins.

10. The method of claim 6 in which zone $Z_B$ has a corresponding data rate $R_B$ that is not in common with zone $Z_A$, in which positioning step (c) includes a step of (c2) sampling a signal from the interface at an initial frequency that is an integer multiple of data rate $R_B$.

11. The method of claim 6 further comprising prior steps of:
    (e) configuring the interface to read data in zone $Z_B$;
    (f) receiving a signal from the interface;
    (g) deriving several values indicative of the interface's performance in zone $Z_B$ from the received signal; and
    (h) storing some of the derived values in the value table each at a position associated with zone $Z_B$.

12. The method of claim 6 in which the storage system includes an integrated circuit comprising the microprocessor, and in which the retrieving step (a) comprises issuing at least one but fewer than 10 commands from the microprocessor to the DMA controller.

13. The method of claim 12 further comprising steps of:
    (j) sensing position data from a servo sector via the interface; and
    (k) deriving a servo control signal from the sensed position data with the microprocessor during step (b).

14. The storage system of claim 6 configured to perform the method of claim 6 further comprising a printed circuit board assembly including a memory containing the value table, the storage system comprising:
    a master integrated circuit (IC) containing the microprocessor and the direct memory access (DMA) controller, the DMA controller being operatively coupled to the memory;
    a slave IC containing the several read channel registers; and
    a bus coupled between the master IC and the slave IC, the bus controllable by the DMA controller to perform updating step (b).

15. An apparatus comprising:
    an interface configured to read data from a storage medium;
    a memory containing several values indexed by zone identifiers;
    a first controller chip containing a microprocessor and a direct memory access (DMA) controller, the DMA controller operatively coupled to the memory;
    a first channel chip having several registers; and
    a bus operatively coupled between the interface and the chips, the bus controllable by the DMA controller to read from the memory and to update several of the registers in response to a zone transition event.

16. A method comprising steps of:
(a) providing data from a storage medium via a bus, the bus operatively connected to at least one register, the storage medium, and a controller chip;
(b) updating the at least one register or parameter via the bus in response to a zone transition event; and
(c) continuing providing data from the storage medium via the bus responsive to the updating.

17. The method of claim 16 wherein the bus is serial.

18. The method of claim 16 wherein the bus is parallel.

19. A method for reducing processing burden on a processing device, comprising steps of transmitting first data in response to a read command from a storage medium via a bus coupled to the processing device, updating at least one register or parameter via the bus in response to a zone transition event, and transmitting second data in response to the read command from the storage medium via the bus in response to the updating step.

20. The method of claim 19 wherein the bus is characterized as a selected one of a serial bus or a parallel bus.

21. The method of claim 19 wherein the first and second data are respectively characterized as user data transferred between a host device and a storage medium.

22. The method of claim 21, wherein the user data are transmitted via the bus between a read/write channel and a controller.

23. The method of claim 19, wherein the first data are transmitted at a first data rate and the second data are transmitted at a second rate different than the first rate.

* * * * *